(12) United States Patent
Tajima

(10) Patent No.: US 11,171,355 B2
(45) Date of Patent: Nov. 9, 2021

(54) BINDING MEMBER, AND BATTERY MODULE

(71) Applicant: Panasonic Intellectual Property Management Co., Ltd., Osaka (JP)

(72) Inventor: Mitsutoshi Tajima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 92 days.

(21) Appl. No.: 16/638,598

(22) PCT Filed: Sep. 7, 2018

(86) PCT No.: PCT/JP2018/033118
§ 371 (c)(1),
(2) Date: Feb. 12, 2020

(87) PCT Pub. No.: WO2019/065152
PCT Pub. Date: Apr. 4, 2019

(65) Prior Publication Data
US 2020/0251768 A1     Aug. 6, 2020

(30) Foreign Application Priority Data

Sep. 26, 2017  (JP) .............................. JP2017-184864

(51) Int. Cl.
*H01M 50/20*     (2021.01)
*H01M 10/04*     (2006.01)

(52) U.S. Cl.
CPC ....... *H01M 10/0481* (2013.01); *H01M 50/20* (2021.01); *H01M 2220/20* (2013.01)

(58) Field of Classification Search
None
See application file for complete search history.

(56) References Cited

FOREIGN PATENT DOCUMENTS

JP          2015-099648          5/2015

OTHER PUBLICATIONS

International Search Report of PCT application No. PCT/JP2018/033118 dated Nov. 20, 2018.

*Primary Examiner* — Wyatt P McConnell
(74) *Attorney, Agent, or Firm* — McDermott Will & Emery LLP

(57) ABSTRACT

A binding member includes a body part extending in stacking direction X of batteries, a supporting part extending in stacking direction X and projecting from the body part, the supporting part supporting a battery stack, and a plurality of pressing parts arranged to have a predetermined interval from the supporting part, the plurality of pressing parts being arranged in stacking direction X and projected from the body part to press the battery stack toward the supporting part. A first pressing part predetermined among the plurality of pressing parts provides a pressing force stronger than a pressing force provided by a second pressing part among the plurality of pressing parts, the second pressing part being closer to a fixing part fixing the battery stack and the binding member with respect to the first pressing part.

9 Claims, 9 Drawing Sheets

BINDING MEMBER, AND BATTERY MODULE

CROSS-REFERENCE TO RELATED APPLICATIONS

This application is a U.S. national stage application of the PCT International Application No. PCT/JP2018/033118 filed on Sep. 7, 2018, which claims the benefit of foreign priority of Japanese patent application 2017-184864 filed on Sep. 26, 2017, the contents all of which are incorporated herein by reference.

TECHNICAL FIELD

The present invention relates to a binding member and a battery module equipped with the binding member.

BACKGROUND ART

For example, there has been known a battery module having a structure in which a plurality of batteries are connected in series as a power source required to output a high voltage for, for example, a vehicle or the like. PTL 1 discloses a battery module. The battery module includes a battery stack including a plurality of batteries stacked and end plates sandwiching the plurality of batteries, and binding members that sandwich the battery stack and are fixed to the end plates.

CITATION LIST

Patent Literature

PTL 1: Unexamined Japanese Patent Publication No. 2015-99648

SUMMARY OF THE INVENTION

In recent years, battery modules need to have further high capacity and provide further high output. To satisfy this necessity, a number of batteries stacked in a battery module tends to increase. In contrast, increase of the number of batteries makes it difficult to evenly hold each battery in the battery module. Equalizing holding of batteries is important for stable operation of the battery module.

The present invention has been conceived in light of such circumstances, and an object thereof is to provide a technique to increase stability of a battery module.

An aspect of the present invention is a binding member. The binding member is for binding a battery stack including a plurality of batteries stacked and includes a body part extending in a stacking direction of the batteries, a supporting part extending in the stacking direction and projecting from the body part in a first direction in which the battery stack and the binding member are aligned, the supporting part supporting the battery stack, and a plurality of pressing parts arranged to have a predetermined interval from the supporting part in a second direction perpendicular to the stacking direction and the first direction, the plurality of pressing parts being arranged in the stacking direction and projected in the first direction from the body part to press the battery stack toward the supporting part. A first pressing part predetermined among the plurality of pressing parts provides a pressing force stronger than a pressing force provided by a second pressing part among the plurality of pressing parts, the second pressing part being closer to a fixing part fixing the battery stack and the binding member with respect to the first pressing part.

The present invention enables to increase stability of a battery module.

DESCRIPTION OF EMBODIMENT

Figure 1:
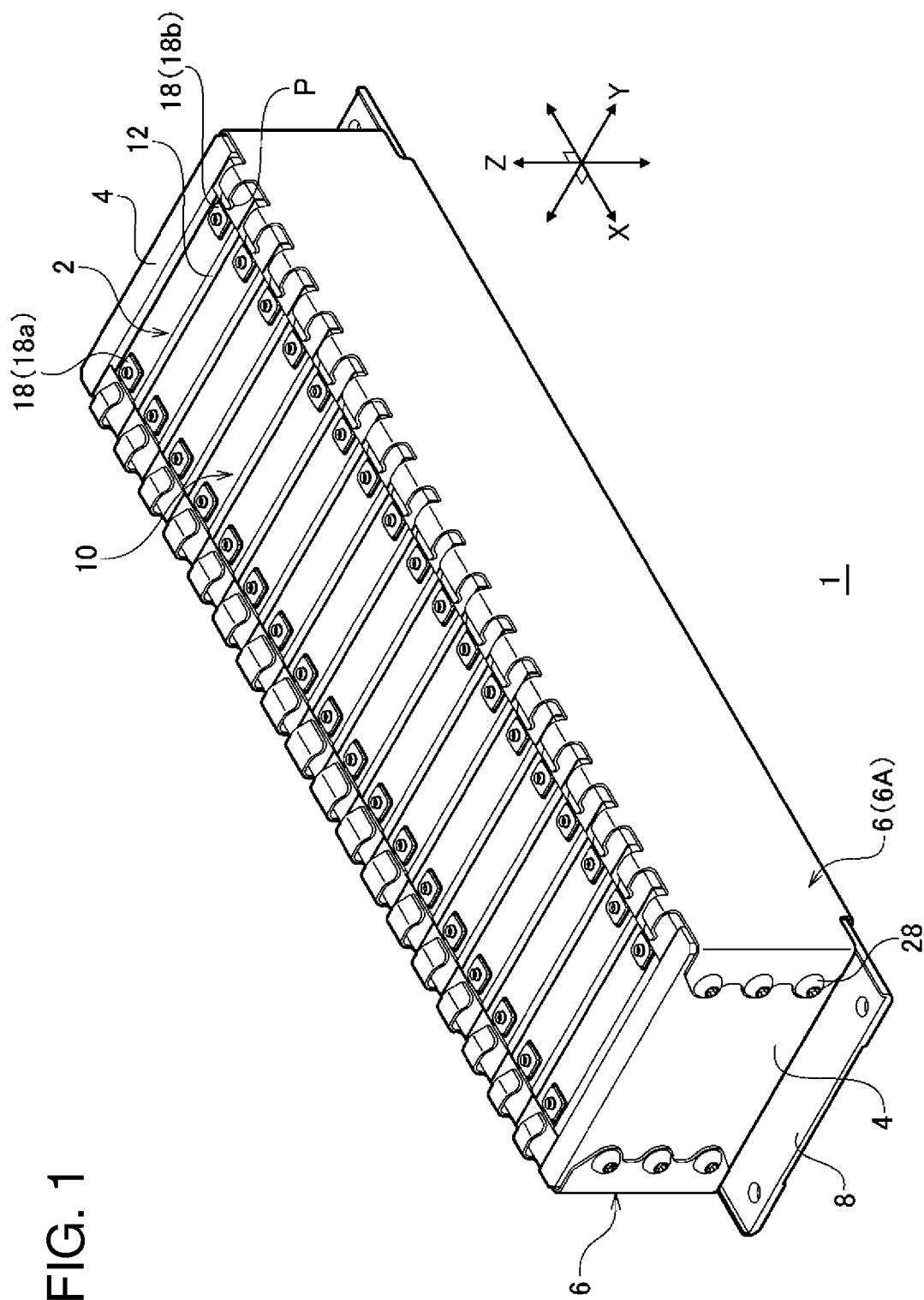
FIG. 1 is a perspective view illustrating a schematic structure of a battery module according to an exemplary embodiment.

Hereinafter, the present invention will be described with reference to the drawings on the basis of a preferred exemplary embodiment. The exemplary embodiment is an exemplification and does not limit the invention. All features described in the exemplary embodiment and combinations of the features are not necessarily essential to the invention. The same reference marks are assigned to the same or equivalent configuration elements, members, and processes illustrated in the drawings, and a duplicate description will be appropriately omitted. Further, scales or shapes of parts illustrated in the drawings are conveniently set for the sake of easy understanding, and should not be interpreted as limitation unless particularly mentioned. In some cases, even the same members may slightly differ in scale or the like between the drawings. Terms "first", "second", and the like, when used in the present description or claims, do not mean any order or importance unless particularly mentioned, and are used for distinguish between one configuration and another configuration.

Figure 2:
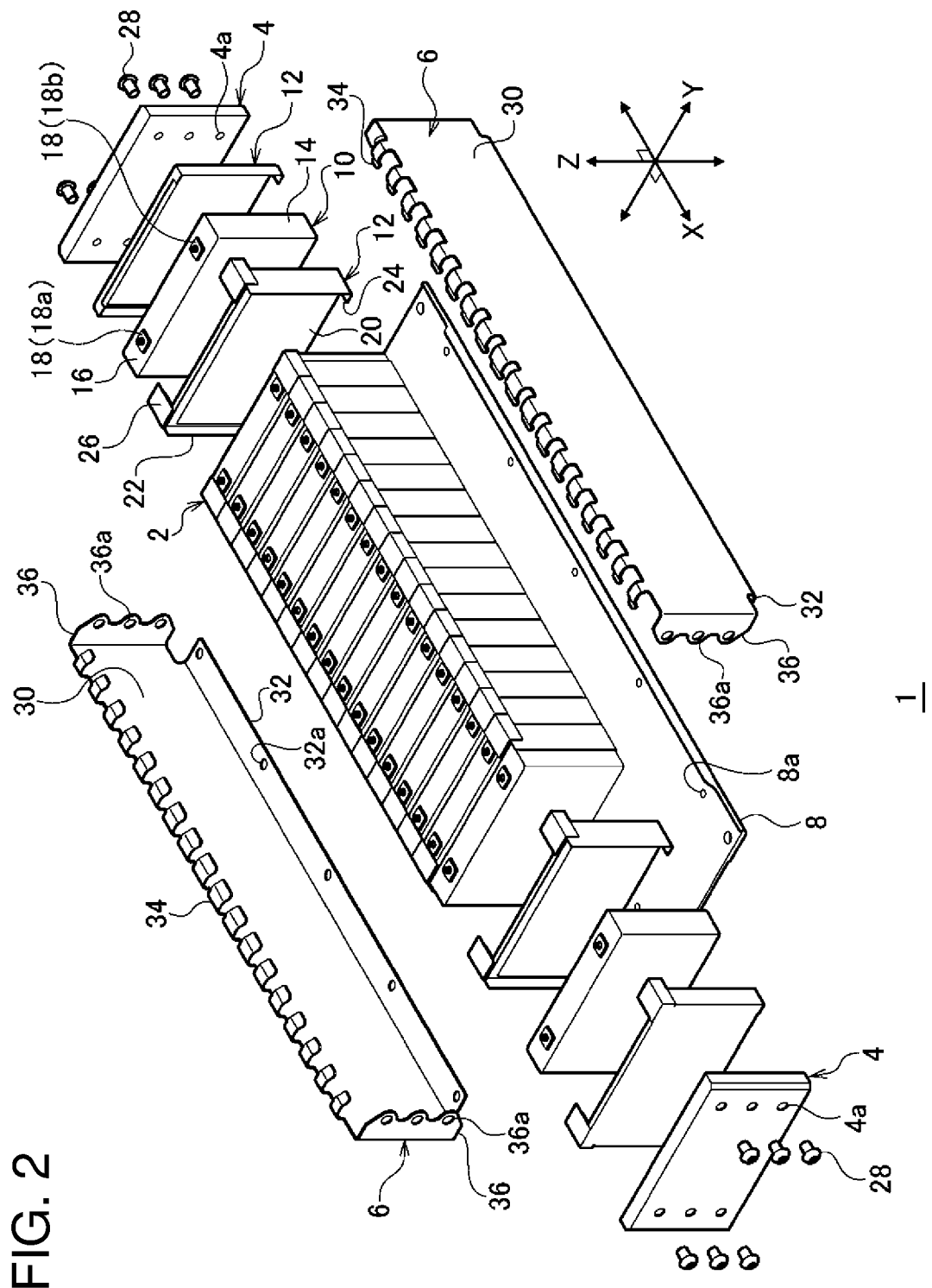
FIG. 2 is an exploded perspective view of the battery module.

FIG. 1 is a perspective view illustrating a schematic structure of a battery module according to an exemplary embodiment. FIG. 2 is an exploded perspective view of the battery module. Battery module 1 includes, as a main configuration, battery stack 2, a pair of binding members 6 (6A), and cooling plate 8.

Battery stack 2 includes a plurality of batteries 10 stacked, a plurality of separators 12, and a pair of end plates 4. Battery 10 is a rechargeable secondary battery such as a lithium ion battery, a nickel metal hydride battery, or a nickel-cadmium battery. Battery 10 is a so-called prismatic (rectangular) battery, and has exterior can 14 having a flat rectangular-parallelepiped shape. An opening that is substantially rectangular is formed on a surface of exterior can 14. An electrode assembly, electrolyte, and the like are housed in exterior can 14 through the opening. Exterior can 14 is covered with an insulating film not shown such as a shrink tube. Covering a surface of exterior can 14 with the insulating film enables to suppress each of short circuit between neighboring batteries 10, short circuit between battery 10 and end plate 4, and short circuit between binding member 6 and cooling plate 8. Sealing plate 16 for sealing exterior can 14 is provided on the opening of exterior can 14.

On sealing plate 16, output terminal 18 as a positive electrode is provided near one end in a longitudinal direction, and output terminal 18 as a negative electrode is provided near the other end in the longitudinal direction. Hereinafter, output terminal 18 as a positive electrode is referred to as positive-electrode terminal 18a, and output terminal 18 as a negative electrode is referred to as negative-electrode terminal 18b as appropriate. When there is no need to distinguish polarities of output terminals 18, positive-electrode terminal 18a and negative-electrode terminal 18b are collectively referred to as output terminal 18. On sealing plate 16, a safety valve (not shown) is provided between the pair of output terminals 18. The safety valve is configured to be capable of opening to release internal gas when an internal pressure of exterior can 14 is increased to a predetermined value or more. Exterior can 14, sealing plate 16, and output terminals 18 are electric conductors and are made of metal, for example.

In the exemplary embodiment, a surface of battery 10 on a side where sealing plate 16 is provided is assumed as an upper surface of battery 10, and a surface of battery 10 on a side opposite to the upper surface is assumed as a bottom surface of battery 10. Further, battery 10 has two main surfaces connecting the upper surface and the bottom surface to each other. The main surfaces have the largest area among six surfaces of battery 10. Two remaining surfaces excluding the upper surface, the bottom surface, and the two main surfaces are assumed as side surfaces of battery 10. An upper surface side of battery 10 is assumed as an upper surface of battery stack 2, and a bottom surface side of battery 10 is assumed as a bottom surface of battery stack 2. For the sake of convenience, an upper surface side of battery stack 2 is assumed as a vertically upward direction, and a bottom surface side of battery stack 2 is assumed as a vertically downward direction.

The plurality of batteries 10 are stacked such that the main surfaces of neighboring batteries 10 face to each other. Note that "stack" means alignment of a plurality of members in any one direction. Therefore, stacking of batteries 10 also includes alignment of the plurality of batteries 10 in a horizontal direction. Further, each battery 10 is disposed such that output terminals 18 are oriented in the same direction (for the sake of convenience herein, vertically upward direction). Two neighboring batteries 10 are stacked such that positive-electrode terminal 18a of one battery 10 and negative-electrode terminal 18b of the other battery 10 are adjacent to each other. Positive-electrode terminal 18a and negative-electrode terminal 18b are electrically connected to each other via a bus bar (not shown). Output terminals 18 of the same polarity of two neighboring batteries 10 may be connected to each other via the bus bar.

Separator 12 is also called an insulating spacer, and is made of resin having an insulation property, for example. Examples of the resin forming separator 12 include thermoplastic resins such as a polypropylene (PP), a polybutylene terephthalate (PBT), a polycarbonate (PC), Noryl (registered trademark) resin (modified PPE), and the like. The plurality of batteries 10 and the plurality of separators 12 are stacked respectively alternately. Separator 12 has flat surface portion 20 parallel to the main surfaces of battery 10, and wall portion 22 extending from an end of flat surface portion 20 in stacking direction X of batteries 10 (a direction indicated by arrow X in each drawing).

Flat surface portion 20 is extended between opposed main surfaces of two neighboring batteries 10. With such a configuration, exterior cans 14 of neighboring batteries 10 are insulated from each other more surely. Flat surface portion 20 is also extended between battery 10 and end plate 4. This arrangement insulates more surely between exterior can 14 of battery 10, and end plate 4. Also, a portion of the upper surface of battery 10, the side surfaces, and a portion of the bottom surface of battery 10 are covered with wall portion 22. This configuration enables to suppress short circuit between neighboring batteries 10 that can be caused by, for example, condensation on a surface of battery 10 or end plate 4. This arrangement also insulates more surely between exterior can 14 of battery 10, and binding member 6.

Wall portion 22 includes cutout 24 to expose the bottom surface of battery 10. Providing cutout 24 enables to prevent thermal connection between battery 10 and cooling plate 8 from being blocked by separator 12.

Separator 12 also includes pressing receiving part 26 oriented toward an upper direction in vertical direction Z (direction indicated by arrow Z in the drawings) perpendicular to stacking direction X and horizontal direction Y (direction indicated by arrow Y in the drawings) at both ends of battery 10 in horizontal direction Y perpendicular to stacking direction X.

The plurality of batteries 10 and the plurality of separators 12, which are stacked, are sandwiched by the pair of end plates 4. The pair of end plates 4 is arranged at both ends of battery stack 2 in stacking direction X of batteries 10. End plate 4 is made of a metal sheet, for example. A main surface of end plate 4 is provided with screw hole 4a. Fastening screw 28 is screwed into screw hole 4a.

The pair of binding members 6 is also called a bind bar and a member for binding battery stack 2. The pair of binding members 6 is arranged in horizontal direction Y, and battery stack 2 is disposed between the pair of binding members 6. Binding member 6 includes body part 30, supporting part 32, a plurality of pressing parts 34, and a pair of fixing parts 36.

Body part 30 is a part having a rectangular shape extending in stacking direction X of batteries 10. Body part 30 extends in parallel to the side surface of each battery 10. Supporting part 32 extends in stacking direction X and projects from body part 30 in a first direction in which battery stack 2 and binding members 6 are aligned. In the exemplary embodiment, supporting part 32 projects in horizontal direction Y from a lower end of body part 30. Supporting part 32 is a plate-shaped body continuous in stacking direction X, and supports battery stack 2 in a state where binding members 6 are assembled to battery stack 2.

The plurality of pressing parts 34 are arranged to have a predetermined interval with respect to supporting part 32 in a second direction perpendicular to stacking direction X and the first direction. The plurality of pressing parts 34 project in the first direction from body part 30. In the present exemplary embodiment, the plurality of pressing parts 34 are connected to an upper end of respective body parts 30. That is, the plurality of pressing parts 34 are arranged to have an interval with respect to supporting part 32 in vertical direction Z. Supporting part 32 and pressing part 34 are opposed to each other in vertical direction Z. Pressing part 34 projects in horizontal direction Y from the upper end of body part 30. Also, the plurality of pressing parts 34 are arranged at predetermined intervals in stacking direction X. Pressing parts 34 are disposed to correspond to respective batteries 10. Each pressing part 34 has a plate spring shape, and presses battery stack 2 and eventually presses battery 10 toward supporting part 32.

The pair of fixing parts 36 is a plate-shaped body projecting in horizontal direction Y from both ends of body part 30 in stacking direction X. "End" includes not only an outermost side portion in stacking direction X but also a neighborhood of the outermost side portion. The pair of fixing parts 36 is opposed to each other in stacking direction X. Each fixing part 36 is provided with through hole 36a through which fastening screw 28 is inserted. The pair of fixing parts 36 fixes binding member 6 to battery stack 2.

For example, binding member 6 can be formed by preparing a metal sheet having a predetermined shape having projections that become supporting part 32, a plurality of pressing parts 34, and a pair of fixing parts 36 in respective sides of the metal sheet having a rectangular shape, and subjecting each side of the metal sheet to bending processing.

Cooling plate 8 is a mechanism for cooling the plurality of batteries 10. Cooling plate 8 is formed of a material having heat transfer property such as a metal. Battery stack 2 is placed on a main surface of cooling plate 8. Battery stack 2 is fixed on cooling plate 8 by inserting a fastening member (not shown) such as a screw through through hole 32a of supporting part 32 and through hole 8a of cooling plate 8. Accordingly, cooling plate 8 also functions as a mounting table of battery stack 2. Each battery 10 is cooled by heat exchange between battery 10 and cooling plate 8. Cooling plate 8 may be provided with a refrigerant pipe (not shown) in which refrigerant flows.

Battery module 1 is assembled as follows, for example. That is, first, the plurality of batteries 10 and the plurality of separators 12 are respectively alternatively arranged and sandwiched by the pair of end plates 4 to form battery stack 2. The pair of binding members 6 is attached to battery stack 2. A portion of battery stack 2 is entered in a space surrounded by supporting part 32, the plurality of pressing parts 34, and the pair of fixing parts 36 in each binding member 6. Also, each binding member 6 is positioned such that through hole 36a is overlapped with screw hole 4a of end plate 4. In this state, fastening screw 28 is inserted through through hole 36a and screwed into screw hole 4a. This makes battery stack 2 fastened by the pair of binding members 6.

In the state where binding members 6 are assembled to battery stack 2, the plurality of batteries 10 are sandwiched by the pair of fixing parts 36 to be fastened in stacking direction X. These positions each battery 10 in stacking direction X. Also, battery stack 2 comes into contact with supporting part 32 at the bottom surface of battery stack 2. Accordingly, each battery 10 is supported by supporting part 32 at the bottom surface of each battery 10. Wall portion 22 of separator 12 is interposed between the bottom surface of battery 10 and supporting part 32. Also, battery stack 2 comes into contact with the plurality of pressing parts 34 at the upper surface of battery stack 2. Each pressing part 34 comes into contact with press receiving part 26 of each separator 12. Each press part 34 presses each battery 10 toward supporting part 32 via pressing receiving part 26. That is, battery stack 2 is sandwiched in vertical direction Z by supporting part 32 and the plurality of pressing parts 34. This positions each battery 10 in vertical direction Z.

In this state, the bus bar is electrically connected to output terminal 18 of each battery 10. Thereafter, a cover member (not shown) is attached on the upper surface of battery stack 2. The cover member is also called a top cover, and prevents condensation water, dust, and the like from touching output terminal 18 of batteries 10, the bus bar, a valve, or the like. The cover member can be fixed on the upper surface of battery stack 2 by a known fixing structure (not shown) including a screw and a known locking mechanism. Battery stack 2 to which binding members 6 and the cover member are attached is placed on cooling plate 8, and fixed to cooling plate 8 by inserting the fastening member through through hole 8a and through hole 32a. The above-mentioned steps enable to yield battery module 1. Note that battery module 1 may be manufactured by integrally fixing battery stack 2 and cooling plate 8 by binding members 6 after battery stack 2 is installed on cooling plate 8. In this case, cooling plate 8 is disposed inside the pair of binding members 6.

Binding member 6 is fixed to battery stack 2 at a predetermined position. As a result of intensive study, the inventor of the present invention has found that a pressing force provided by each pressing part 34 differs depending on a distance from a fixing part fixing battery stack 2 and binding member 6. That is, pressing part 34 far from the fixing part tends to provide a weak pressing force as compared with a pressing force provided by pressing part 34 close to the fixing part in a state where battery stack 2 and binding member 6 are assembled. Also, a moment generated in battery stack 2 due to vibration or impact is large in an area far from the fixing part and small in an area close to the fixing part. Therefore, the pressing force is desired to be larger as pressing part 34 becomes away from the fixing part.

Figure 3:
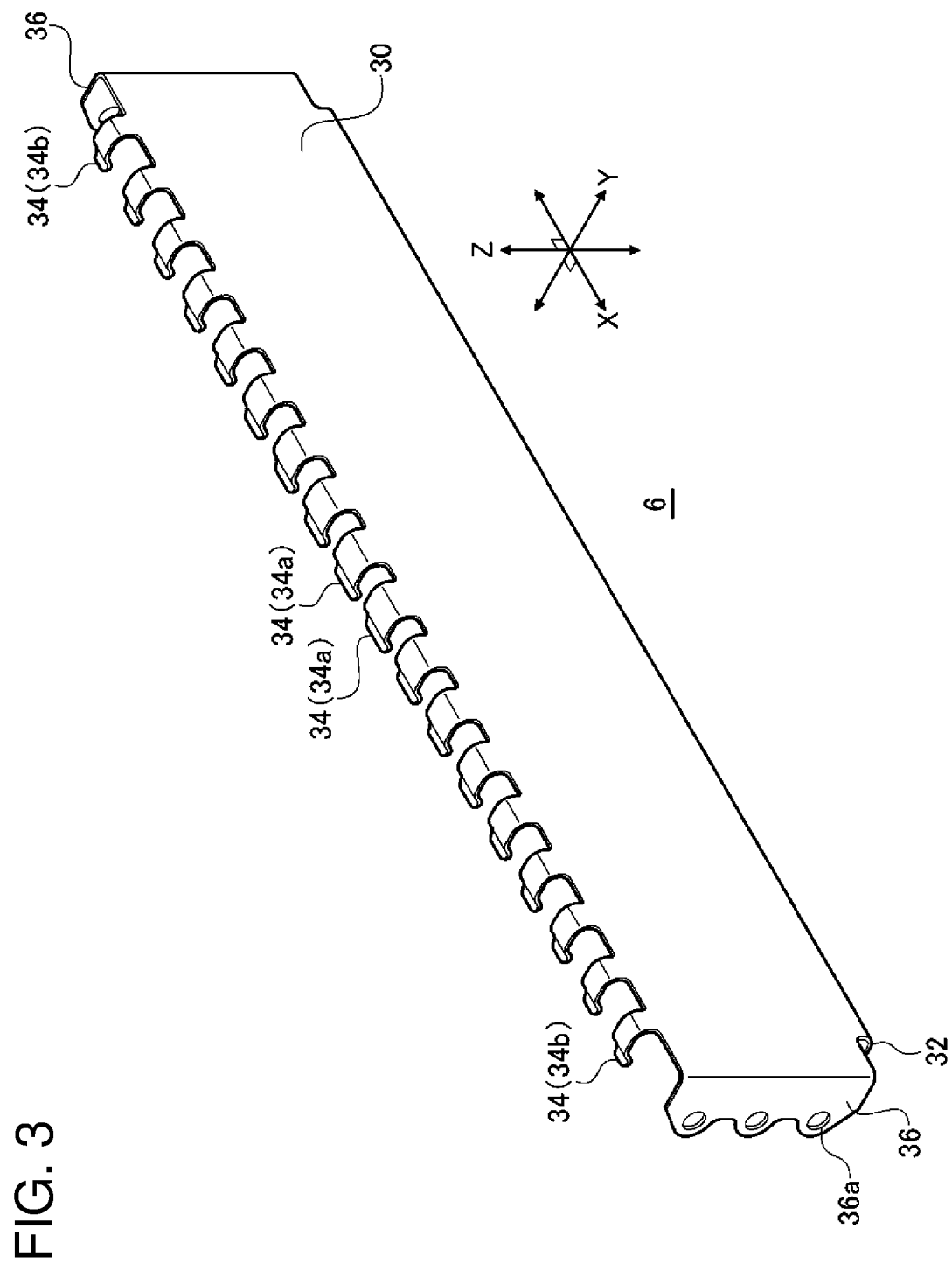
FIG. 3 is a perspective view illustrating a schematic structure of a binding member according to the exemplary embodiment.
Figure 4:
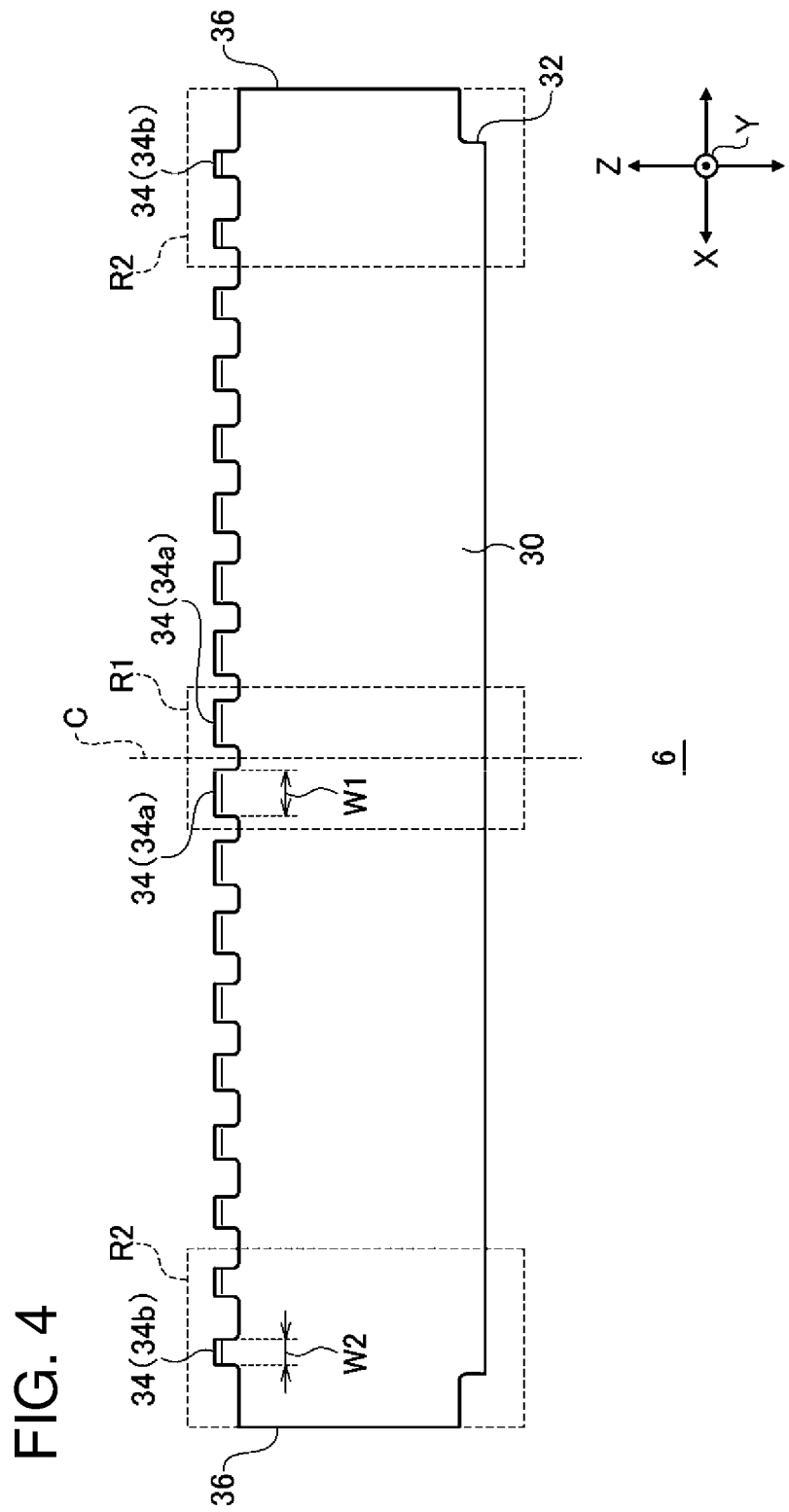
FIG. 4 is a front view illustrating the schematic structure of the binding member.

In contrast, binding member 6 according to the present exemplary embodiment has a structure as described below to make a pressing force of each pressing part 34 even in a state where battery stack 2 and binding member 6 are assembled. FIG. 3 is a perspective view illustrating a schematic structure of a binding member according to the exemplary embodiment. FIG. 4 is a front view illustrating a schematic structure of the binding member.

The plurality of pressing parts 34 provided in binding member 6 include predetermined first pressing part 34a and predetermined second pressing part 34b whose pressing forces are different. Second pressing part 34b is closer to a fixing part between battery stack 2 and binding member 6, that is, fixing part 36 of binding member 6 with respect to first pressing part 34a in stacking direction X. First pressing part 34a provides a strong pressing force as compared with second pressing part 34b. In the exemplary embodiment, binding member 6 is fixed to battery stack 2 at both ends of binding member 6 in stacking direction X. Accordingly, pressing part 34 positioned inside in stacking direction X tends to provide a weak pressing force as compared with pressing part 34 positioned outside in stacking direction X in a state where binding members 6 are assembled to battery stack 2. Accordingly, first pressing part 34a providing a strong pressing force is positioned on a center side in stacking direction X with respect to second pressing part 34b.

For example, first pressing part 34a is included in center region R1 including center C of binding member 6 in stacking direction X. Second pressing part 34b is included in end region R2 including an end of binding member 6 in stacking direction X. Also, for example, first pressing part 34a is pressing part 34 closest to center C, and second pressing part 34b is pressing part 34 positioned on an outermost side in stacking direction X.

Width W1 in stacking direction X of first pressing part 34a is larger than width W2 in stacking direction X of second pressing part 34b. This makes a pressing force of first pressing part 34a larger than a pressing force of second pressing part 34b. In the present exemplary embodiment, a whole of first pressing part 34a and a whole of second pressing part 34b respectively have even widths W1, W2, but this configuration is not particularly limited. First pressing part 34a is enough to have a part having a width wider than a width of second pressing part 34b at least at a portion of first pressing part 34a as long as the pressing force of first pressing part 34a becomes larger than the pressing force of second pressing part 34b.

FIG. 3 and FIG. 4 illustrate a structure in which the width of pressing part 34 becomes gradually small as pressing part 34 is away from center C toward both ends of binding member 6. In this case, the pressing force of pressing part 34 becomes gradually small as pressing part 34 is away from center C toward the both ends. Accordingly, in any two neighboring pressing parts 34, pressing part 34 positioned close to center C is first pressing part 34a, and pressing part 34 positioned close to an end is second pressing part 34b. Change amount and a number of changes of the width changed toward the both ends from center C can be appropriately set.

As described above, binding member 6 according to the present exemplary embodiment includes body part 30 extending in stacking direction X of batteries 10, supporting part 32 extending in stacking direction X and projecting from body part 30 to support battery stack 2, and the plurality of pressing parts 34 arranged to have a predetermined interval with respect to supporting part 32. The plurality of pressing parts 34 are arranged in stacking direction X and project from body part 30 to press battery stack 2 toward supporting part 32. First pressing part 34a predetermined among the plurality of pressing parts 34 provides a strong pressing force as compared with a pressing force provided by second pressing part 34b closer to fixing part 36 with respect to first pressing part 34a.

This makes it possible to reduce difference of pressing forces among pressing parts 34 for equalization in a state where binding member 6 is assembled to battery stack 2. This makes it possible to equalize holding of each battery 10. Furthermore, using such binding member 6 enables to increase stability of battery module 1.

Binding member 6 according to the present exemplary embodiment includes fixing parts 36 at both ends of binding member 6 in stacking direction X. That is, binding members 6 are fixed to battery stack 2 at the both ends of binding member 6. First pressing part 34a is positioned on the center side in stacking direction X with respect to second pressing part 34b, and second pressing part 34b is positioned outside in stacking direction X with respect to first pressing part 34a. This makes it possible to further equalize holding of each battery 10.

Furthermore, in the present exemplary embodiment, a difference between pressing forces of first pressing part 34a and second pressing part 34b is provided by increasing width W1 of first pressing part 34a than width W2 of second pressing part 34b. This enables to equalize pressing forces of pressing parts 34 with a simple structure. This enables to suppress complication of manufacturing process. This also enables to easily obtain a structure in which body part 30 and pressing parts 34 are integrated. This enables to suppress increase of manufacturing cost of binding member 6.

The present invention is not limited to the above-mentioned exemplary embodiment, and modifications such as various design changes can be added based on knowledge of the person of ordinary skill in the art. The modified exemplary embodiments are also included in the scope of the present invention. New exemplary embodiments made by adding modifications to the above-mentioned exemplary embodiment also have respective effects of the combined exemplary embodiments and the modified exemplary embodiments.

Hereinafter, modified examples of binding member 6 according to the exemplary embodiment will be described. In description of each modified example, features different from the exemplary embodiment will be mainly described. Description of configuration common to the exemplary embodiment will be briefly made or omitted.

First Modified Example

Figure 5:
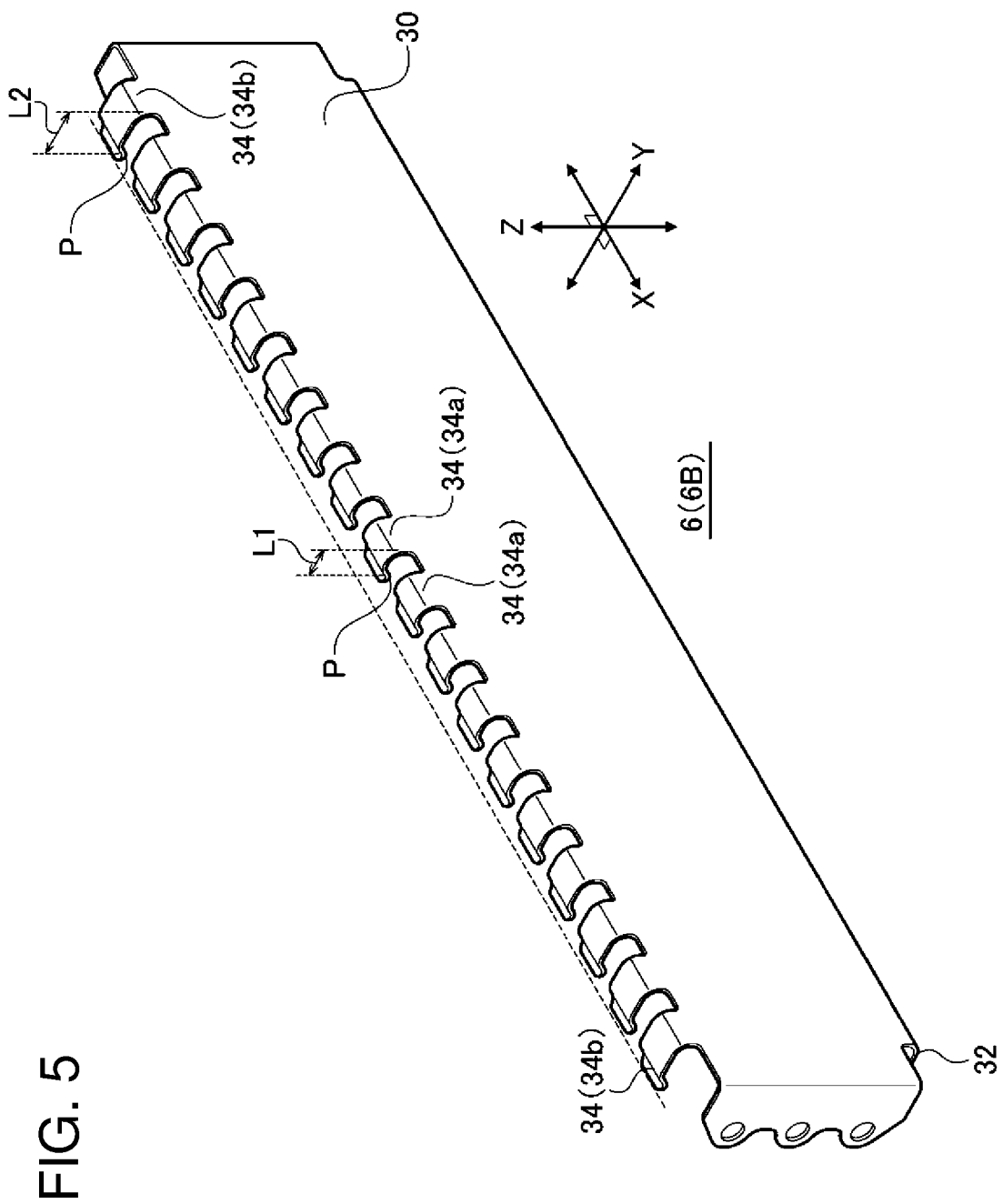
FIG. 5 is a perspective view illustrating a schematic structure of a binding member according to a first modified example.

FIG. 5 is a perspective view illustrating a schematic structure of a binding member according to a first modified example. Binding member 6 (6B) according to the present modified example has a structure in pressing part 34 different from the structure of pressing part 34 in the exemplary embodiment. Specifically, as to a distance in horizontal direction Y from contact point P between pressing part 34 and battery stack 2 to body part 30, distance L1 in first pressing part 34a is shorter than distance L2 in second pressing part 34b. That is, a projection length from body part 30 is shorter in first pressing part 34a than a projection length in second pressing part 34b. This enables to increase a pressing force of first pressing part 34a than a pressing force of second pressing part 34b with a simple structure. This enables to suppress complication of manufacturing process. This also enables to easily obtain a structure in which body part 30 and pressing parts 34 are integrated. This enables to suppress increase of manufacturing cost of binding member 6.

Second Modified Example

Figure 6:
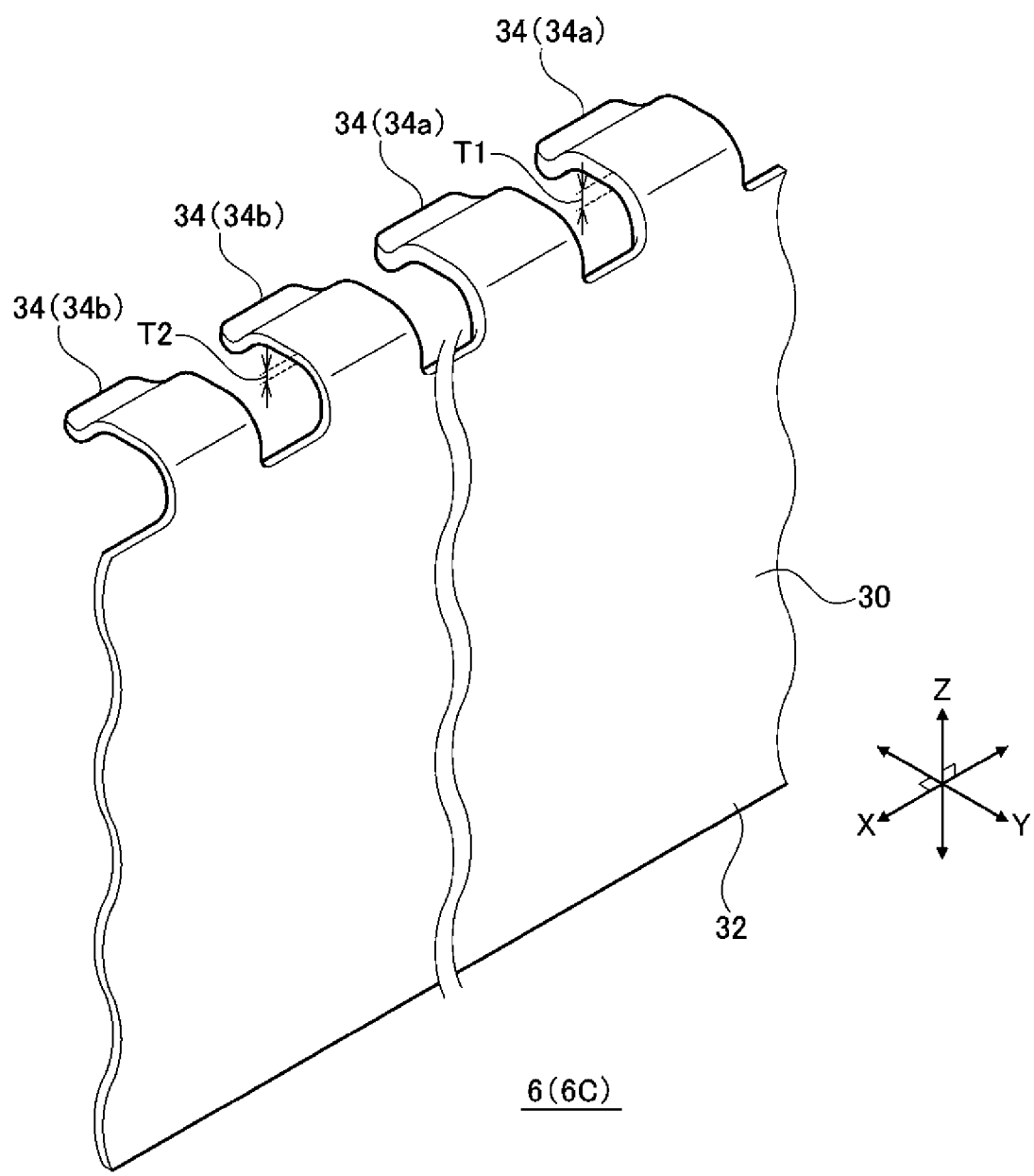
FIG. 6 is a perspective view illustrating a schematic structure of a portion of a binding member according to a second modified example.

FIG. 6 is a perspective view illustrating a schematic structure of a portion of a binding member according to a second modified example. Binding member 6 (6C) according to the present modified example has a structure in pressing part 34 different from the structure of pressing part 34 in the exemplary embodiment. Specifically, thickness T1 of first pressing part 34a is larger than thickness T2 of second pressing part 34b. This enables to increase a pressing force of first pressing part 34a than a pressing force of second pressing part 34b. In the modified example, although a whole of first pressing part 34a and a whole of second pressing part 34b respectively have uniform thicknesses T1, T2, this configuration is not particularly limited. It is sufficient that at least a portion of first pressing part 34a has a part thicker than a thickness of second pressing part 34b as long as the pressing force of first pressing part 34a becomes larger than the pressing force of second pressing part 34b.

For example, body part 30 and second pressing part 34b are formed to have a same thickness, and first pressing part 34a is formed to have a thickness thicker than the same thickness. Alternatively, body part 30 and first pressing part 34a are formed to have the same thickness, and second pressing part 34b is formed to have a thickness thinner than the thickness. Note that both first pressing part 34a and second pressing part 34b may be formed to have a thickness different from a thickness of body part 30. Also, pressing part 34 having the same thickness as the thickness of body part 30 may be integrally formed with body part 30, and pressing part 34 having a thickness different from the thickness of body part 30 may be separately formed from body part 30 to be joined to body part 30. This enables to simply adjust a thickness of pressing part 34.

Third Modified Example

Figure 7:
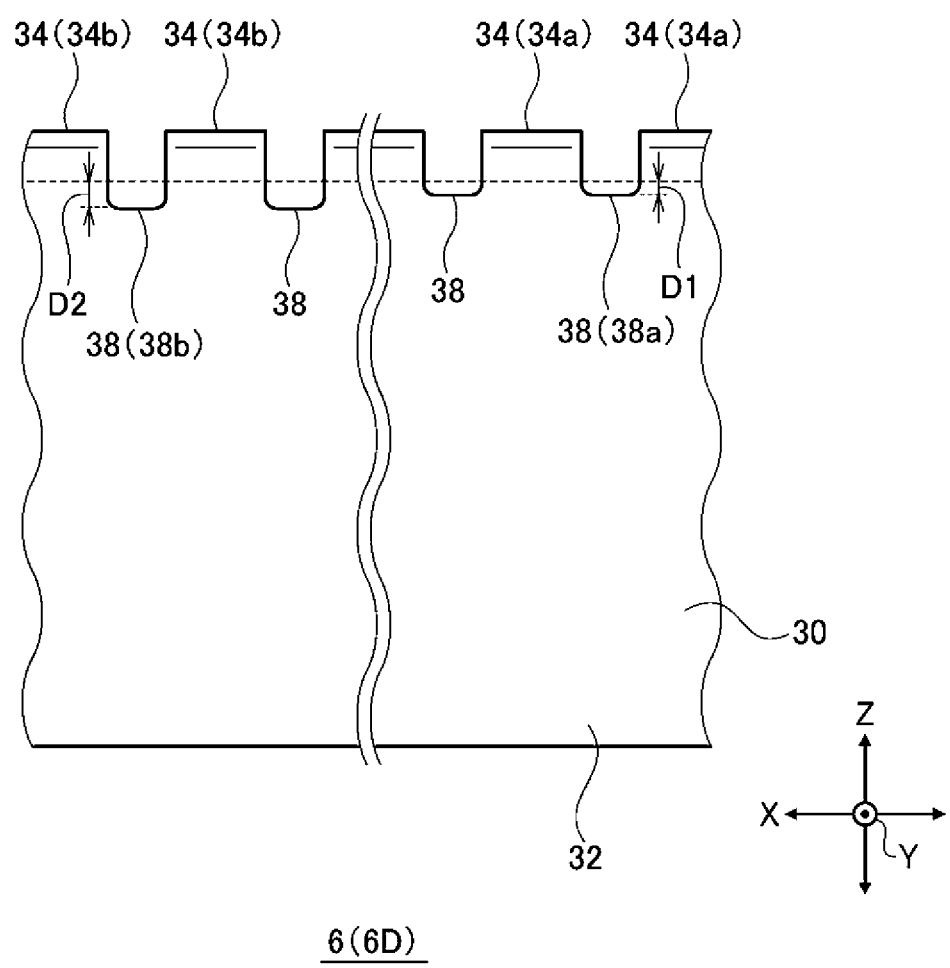
FIG. 7 is a front view illustrating a schematic structure of a portion of a binding member according to a third modified example.

FIG. 7 is a front view illustrating a schematic structure of a portion of a binding member according to a third modified example. Binding member 6 (6D) according to the present modified example has a structure in body part 30 different from the structure of body part 30 in the exemplary embodiment. Specifically, body part 30 has cutout 38 between neighboring two pressing parts 34. Cutout 38 is a recess extending toward a side of supporting part 32 from a long side of body part 30 on which pressing part 34 is connected.

Cutouts 38 include first cutout 38a and second cutout 38b different in their depths. First cutout 38a and first pressing part 34a are adjacent to each other, and second cutout 38b and second pressing part 34b are adjacent to each other. That is, in stacking direction X, first cutout 38a is adjacent to first pressing part 34a and second cutout 38b is adjacent to second pressing part 34b. Depth D1 of first cutout 38a is shallower than depth D2 of second cutout 38b. This enables to increase a pressing force of first pressing part 34a than a pressing force of second pressing part 34b with a simple structure. This enables to suppress complication of manufacturing process. This also enables to easily obtain a structure in which body part 30 and pressing parts 34 are integrated. This enables to suppress increase of manufacturing cost of binding member 6.

Fourth Modified Example

Figure 8:
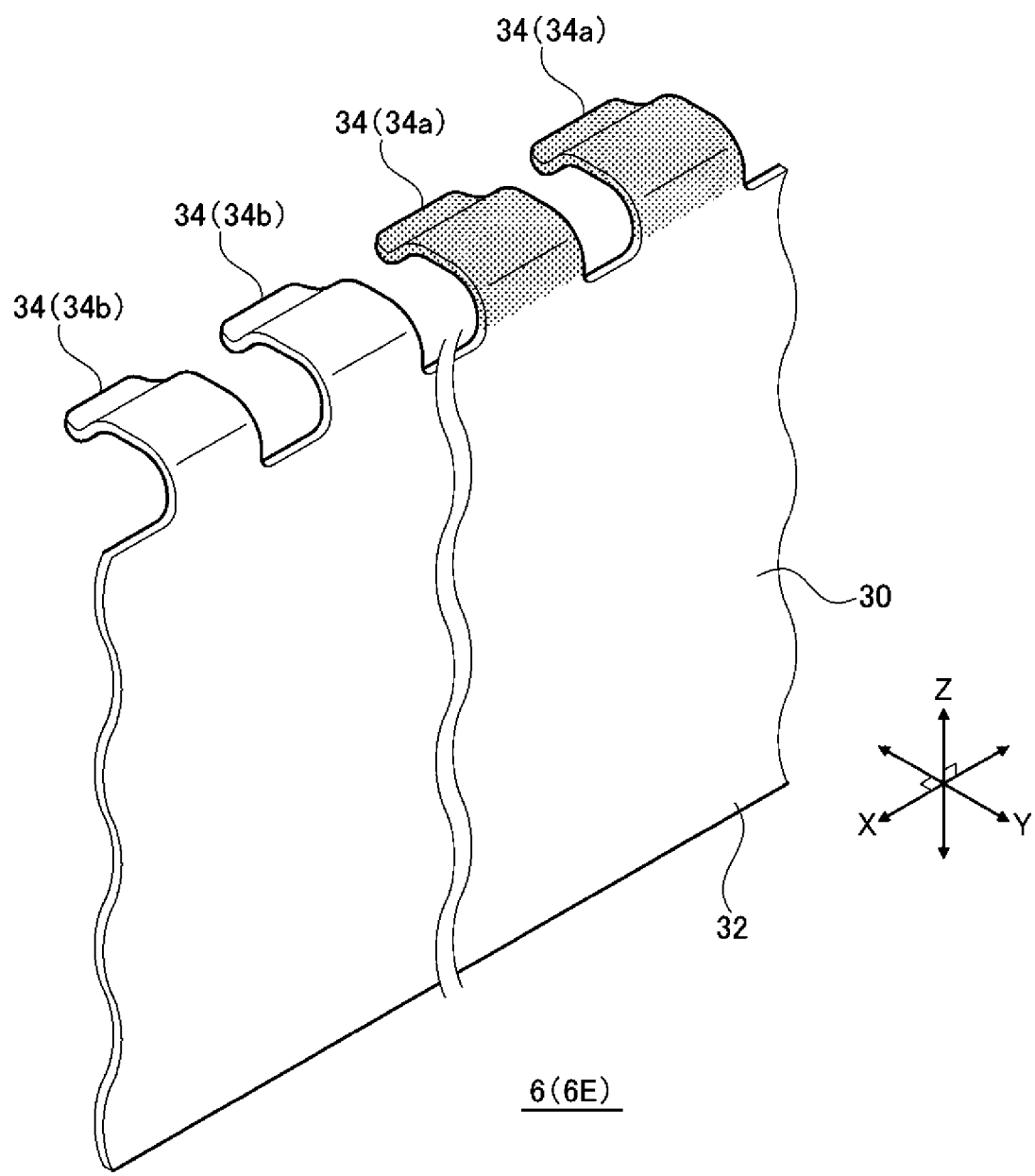
FIG. 8 is a perspective view illustrating a schematic structure of a portion of a binding member according to a fourth modified example.

FIG. 8 is a perspective view illustrating a schematic structure of a portion of a binding member according to a fourth modified example. Binding member 6 (6E) according to the present modified example uses a material forming pressing part 34 different from a material forming pressing part 34 in the exemplary embodiment. Specifically, in binding member 6 according to the present modified example, a material forming first pressing part 34a is different from a material forming second pressing part 34b.

First pressing part 34a is formed of a material higher in Young's modulus than a material of second pressing part 34b. Examples of the material forming first pressing part 34a include steel and stainless steel, for example, Examples of the material forming second pressing part 34b include aluminum, for example. This enables to increase a pressing force of first pressing part 34a than a pressing force of second pressing part 34b. In the present modified example, the whole of first pressing part 34a and the whole of second pressing part 34b each are formed by the same material, but this configuration is not particularly limited. It is sufficient that at least at a portion of first pressing part 34a is formed by a material higher in Young's modulus than a material of second pressing part 34b as long as a pressing force of first pressing part 34a becomes larger than a pressing force of second pressing part 34b.

For example, body part 30 and second pressing part 34b are formed by the same material, and first pressing part 34a is formed by a material higher in Young's modulus than the material. Alternatively, body part 30 and first pressing part 34a are formed by the same material, and second pressing part 34b is formed by a material lower in Young's modulus than the material. Note that both first pressing part 34a and second pressing part 34b may be formed by materials different from a material of body part 30. Pressing part 34 formed of the same material as a material of body part 30 may be integrally formed with body part 30, and pressing part 34 formed of a material different from a material of body part 30 may be separately formed from body part 30 to be joined to body part 30. This enables to easily change a material of pressing part 34.

Fifth Modified Example

Figure 9:
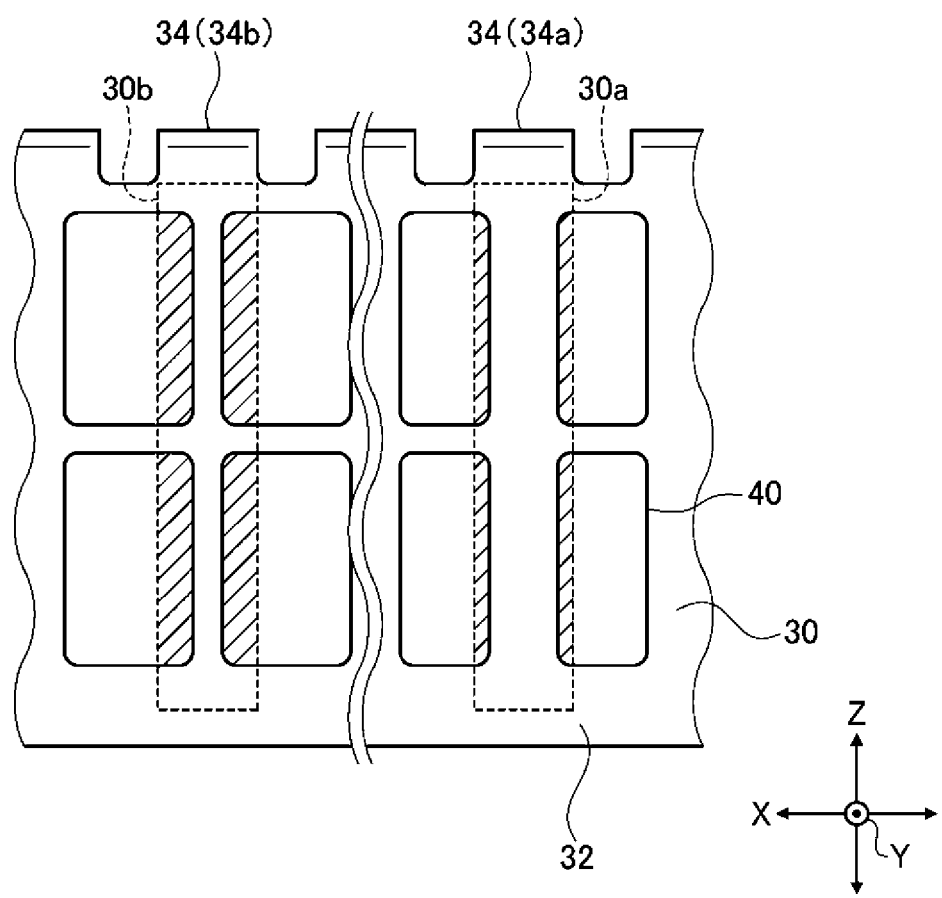
FIG. 9 is a front view illustrating a schematic structure of a portion of a binding member according to a fifth modified example.

FIG. 9 is a front view illustrating a schematic structure of a portion of a binding member according to a fifth modified example. Binding member 6 (6F) according to the present modified example has a structure in body part 30 different from the structure of body part 30 in the exemplary embodiment. Specifically, body part 30 includes wall removal parts 40 penetrating body part 30 in a first direction. In the present modified example, the first direction is horizontal direction Y. In the present modified example, the plurality of wall removal parts 40 are formed by a plurality of through holes provided on body part 30. Wall removal parts 40 each have a substantially rectangular shape long in vertical direction Z, and are arranged at predetermined intervals in stacking direction X.

Arrangement of a remaining part and wall removal parts 40 of body part 30 are set as described below. That is, when viewed from horizontal direction Y, a total area of wall removal parts 40 in first region 30a sandwiched between first pressing part 34a and supporting part 32 (total of areas of hatched portions in first region 30a) is smaller than a total area of wall removal parts 40 in second region 30b sandwiched between second pressing part 34b and supporting part 32 (total of areas of hatched portions in second region 30b). That is, the remaining part of body part 30 is large in first region 30a, and the remaining part of body part 30 is small in second region 30b. Wall removal parts 40 are extended more between first pressing part 34a and supporting part 32 as compared with wall removal parts 40 extended between second pressing part 34b and supporting part 32. In the present modified example, wall removal parts 40 having a small opening area are disposed at a center region of body part 30, and wall removal parts 40 having a large opening area are disposed at end regions of body part 30.

This enables to increase a pressing force of first pressing part 34a than a pressing force of second pressing part 34b with a simple structure. This enables to suppress complication of manufacturing process. This also enables to easily obtain a structure in which body part 30 and pressing parts 34 are integrated. This enables to suppress increase of manufacturing cost of binding member 6.

Others

In the above-mentioned each modified example, a distance from contact point P of pressing part 34 to body part 30, a thickness of pressing part 34, a depth of cutout 38, Young's modulus of a material forming pressing part 34, and a total area of wall removal parts 40 may be gradually changed from center C of binding member 6 toward both ends as in the exemplary embodiment. Also, structures for changing a pressing force of pressing part 34 in the exemplary embodiment and modified examples can be combined as appropriate.

In the above-mentioned exemplary embodiment and modified examples, cooling plate 8 may be omitted. For example, a pedestal that is not expected to provide cooling effect may be used instead of cooling plate 8. Also, fixation between binding member 6 and end plate 4 is not limited to bolt fastening. For example, a structure to engage binding member 6 and end plate 4 with each other may be provided for engagement, or both may be fixed by welding. In a case where fixing structure by engagement is employed, binding members 6 can be fixed to end plates 4 near ends slightly close to a center from respective both ends in stacking direction X. Also, short circuit between exterior can 14 of battery 10 and another member such as binding member 6 may be suppressed using an insulating member other than separator 12.

In the above-described exemplary embodiment and modified examples, battery 10 is a prismatic battery. However, a shape of battery 10 is not particularly limited and may be cylindrical, for example. Also, a number of batteries 10 included in battery stack 2 is not particularly limited.

Any combinations of the above-described configuration elements, and converted expressions of the present invention in method, apparatus, system, and the like are also effective as aspects of the present invention.

The invention claimed is:

1. A binding member for binding a battery stack including a plurality of batteries stacked, the binding member comprising:
   - a body part extending in a stacking direction of the batteries;
   - a supporting part extending in the stacking direction and projecting from the body part in a first direction in which the battery stack and the binding member are aligned, the supporting part supporting the battery stack; and
   - a plurality of pressing parts arranged to have a predetermined interval from the supporting part in a second direction perpendicular to the stacking direction and the first direction, the plurality of pressing parts being arranged in the stacking direction and projected in the first direction from the body part to press the battery stack toward the supporting part, wherein
   - a first pressing part predetermined among the plurality of pressing parts provides a pressing force stronger than a pressing force provided by a second pressing part among the plurality of pressing parts, the second pressing part being closer to a fixing part fixing the battery stack and the binding member than the first pressing part.

2. The binding member according to claim 1 comprising the fixing part at both ends in the stacking direction, wherein the first pressing part is positioned on a center side in the stacking direction with respect to the second pressing part.

3. The binding member according to claim 1, wherein a width of at least a portion of the first pressing part is larger than a width of the second pressing part in the stacking direction.

4. The binding member according to claim 1, wherein a distance from a contact point between the first pressing part and the battery stack to the body part is shorter than a distance from a contact point between the second pressing part and the battery stack to the body part.

5. The binding member according to claim 1, wherein the plurality of pressing parts each have a plate spring shape, and
   at least a portion of the first pressing part has a thickness larger than a thickness of the second pressing part.

6. The binding member according to claim 1, wherein the body part has a cutout between neighboring two of the pressing parts, and
   a first cutout neighboring to the first pressing part is shallower than a second cutout neighboring to the second pressing part.

7. The binding member according to claim 1, wherein at least a portion of the first pressing part is formed of a material higher in Young's modulus than a material of the second pressing part.

8. The binding member according to claim 1, wherein the body part includes wall removal parts penetrating the body part in the first direction, and
   when viewed from the first direction, a total area of the wall removal parts in a first region sandwiched between the first pressing part and the supporting part is smaller than a total area of the wall removal parts in a second region sandwiched between the second pressing part and the supporting part.

9. A battery module comprising:
   a battery stack including a plurality of batteries stacked; and
   the binding member according to claim 1.

* * * * *